(12) United States Patent
Ning et al.

(10) Patent No.: US 11,244,326 B2
(45) Date of Patent: Feb. 8, 2022

(54) ANALYTICAL PRECURSOR MINING FOR PERSONALIZED RECOMMENDATION

(71) Applicant: Verizon Media Inc., New York, NY (US)

(72) Inventors: Yue Ning, Mclean, VA (US); Akshay Soni, San Jose, CA (US); Troy Chevalier, San Mateo, CA (US); Rao Shen, Sunnyvale, CA (US); Parikshit Shah, Emerald Hills, CA (US)

(73) Assignee: Verizon Media Inc., New York, NY (US)

( * ) Notice: Subject to any disclaimer, the term of this patent is extended or adjusted under 35 U.S.C. 154(b) by 398 days.

(21) Appl. No.: 15/912,824

(22) Filed: Mar. 6, 2018

(65) Prior Publication Data

US 2019/0279231 A1 Sep. 12, 2019

(51) Int. Cl.
*G06Q 30/02* (2012.01)
*G06Q 30/06* (2012.01)

(52) U.S. Cl.
CPC ..... *G06Q 30/0201* (2013.01); *G06Q 30/0202* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 8,417,715 B1 * | 4/2013 | Bruckhaus | G06Q 10/04 707/758 |
| 9,082,086 B2 * | 7/2015 | Kalai | G06F 16/9535 |
| 10,699,321 B2 * | 6/2020 | Krishnamurthy | G06Q 30/0631 |
| 2009/0281870 A1 * | 11/2009 | Sun | G06Q 99/00 705/7.29 |
| 2010/0169340 A1 * | 7/2010 | Kenedy | G06Q 30/02 707/758 |
| 2010/0287029 A1 * | 11/2010 | Dodge | G06Q 30/02 705/7.31 |

(Continued)

OTHER PUBLICATIONS

Stepp Hochreiter, Optimal Gradient-Based Learning Using Importance Weights, 2005,IEEE, IEEE Xplore: Dec. 27, 2005 (Year : 2005).*

(Continued)

*Primary Examiner* — Mehmet Yesildag
(74) *Attorney, Agent, or Firm* — Bookoff McAndrews, PLLC

(57) ABSTRACT

Systems and methods are disclosed for discovering precursors associated with a current user interaction event. One method comprises receiving a selection of a new item by a user and determining a plurality of similarities between the new item selected by the user and a plurality of historical items, the plurality of historical items being associated with prior user activity. Then a plurality of importance weights associated with the plurality of historical items are determined. Based on the plurality of similarities and the plurality of importance weights, at least one enhanced importance matrix is generated. Further, prior interactions of the user with the plurality of historical items are determined. Based on the enhanced importance matrix and the prior interactions of the user with the plurality of historical items, precursors for the new item selected by the user are identified and provided to a display.

12 Claims, 10 Drawing Sheets

(56) References Cited

U.S. PATENT DOCUMENTS

| | | | | |
|---|---|---|---|---|
| 2011/0010307 | A1* | 1/2011 | Bates | G06Q 30/02 |
| | | | | 705/347 |
| 2012/0030020 | A1* | 2/2012 | Bucak | G06Q 30/02 |
| | | | | 705/14.53 |
| 2013/0124449 | A1* | 5/2013 | Pinckney | G06N 5/048 |
| | | | | 706/52 |
| 2013/0185294 | A1* | 7/2013 | Kami | G06Q 30/02 |
| | | | | 707/732 |
| 2015/0012467 | A1* | 1/2015 | Greystoke | G06N 20/00 |
| | | | | 706/12 |
| 2016/0321684 | A1* | 11/2016 | Chen | G06Q 30/0208 |
| 2017/0300985 | A1* | 10/2017 | Takahashi | G06Q 30/02 |

OTHER PUBLICATIONS

Learning Case Feature Weights from Relevance and Ranking Feedback Luc Lamontagne1 and Alexandre Bergeron-Guyard2; 1 Department of Computer Science and Software Enginering, Université Laval, Québec, Canada; Proceedings of the Twenty-Seventh International Florida Artificia Luc.Lamontagne@ift.ulaval.ca (Year: 2013)<s.*

Tumblr Blog Recommendation with Boosted Inductive Matrix Completion Donghyuk Shin Dept. of Computer Science (Year: 2015).*

M. Jiang, P. Cui, F. Wang, W. Zhu and S. Yang, "Scalable Recommendation with Social Contextual Information," in IEEE Transactions on Knowledge and Data Engineering, vol. 26, No. 11, pp. 2789-2802, Nov. 2014, doi: 10.1109/TKDE.2014.2300487. (Year: 2014).*

Al Mamunur Rashid et al. 2008. "Learning Preferences of New Users in Recommender Systems: An Information Theoretic Approach" SIGKDD Explorations Newsletter 10, 2 (Dec. 2008).

Amit Singhal. Modern information retrieval: a brief overview. Bulletin of the IEEE Computer Society Technical Committee on Data Engineering, 2001. pp. 1-9.

David R. Cox. "The Regression Analysis of Binary Sequences (with discussion)". Journal of the Royal Statistical Society, Series B, vol. 20, No. 2 (1958), pp. 215-242.

Donghyuk Shin, et al. 2015. "Tumblr Blog Recommendation with Boosted Inductive Matrix Completion". In Proceedings of the 24th ACM International on Conference on Information and Knowledge Management (CIKM '15).

F.O. Isinkaye et al. "Recommendation systems: Principles, methods and evaluation". Egyptian Informatics Journal 16, 3 (2015), pp. 261-273.

J. J. Rocchio. 1971. Relevance feedback in information retrieval.

Jonathan L. Herlocker. 1999. Position Statement—Explanations in Recommender Systems. In CHI'99 Workshop, Interacting with Recommender Systems.

L. Xiang et al. 2009. Time-Dependent Models in Collaborative Filtering Based Recommender System. In 2009 IEEE/WIC/ACM International Joint Conference on Web Intelligence and Intelligent Agent Technology, vol. 1. pp. 450-457.

Liang Xiang, et al. 2010. Temporal Recommendation on Graphs via Long- and Short-term Preference Fusion. In Proceedings of the 16th ACM SIGKDD International Conference on Knowledge Discovery and Data Mining (KDD '10). ACM, New York, NY, USA, pp. 723-732.

Liang Xiong, et al. "Temporal Collaborative Filtering with Bayesian Probabilistic Tensor Factorization" Proceedings of the 2010 SIAM International Conference in Data Mining, pp. 211-222.

M. Shahriar Hossain et al. 2012. "Storytelling in Entity Networks to Support Intelligence Analysts". In Proceedings of the 18th ACM SIGKDD International Conference on Knowledge Discovery and Data Mining (KDD). New York, NY, USA, pp. 1375-1383.

Natarajan et al. 2014. "Inductive matrix completion for predicting gene-disease associations". Bioinformatics 30 (Jun. 2014) Issue 12.

Nava Tintarev et al. 2007. "A Survey of Explanations in Recommender Systems." In Proceedings of the 2007 IEEE 23rd International Conference on Data Engineering Workshop (ICDEW '07). IEEE Computer Society, Washington, DC, USA, pp. 801-810.

Ning et al. 2016. "Modeling Precursors for Event Forecasting via Nested Multi-Instance Learning". In Proceedings of the 22Nd ACM SIGKDD International Conference on Knowledge Discovery and Data Mining, KDD '16, 1095-1104. Mew York, NY, USA: ACM.

P. Kefalas et al. "A Time-aware Spatio-textual Recommender System." Expert Syst. Appl. 78, C (Jul. 2017), pp. 396-406.

P. Kefalas et al. "Advances in Algorithms for Time-Dependent Recommender Systems". In 2014 9th International Workshop on Semantic and Social Media Adaptation and Personalization, pp. 38-43.

Paul Resnick, et al. 1994. "GroupLens: An Open Architecture for Collaborative Filtering of Netnews". In Proceedings of the 1994 ACM Conference on Computer Supported Cooperative Work.

Rong et al. Why It Happened: Identifying and Modeling the Reasons of the Happening of Social Events. In Proceedings of the 21st ACM SIGKDD International Conference on Knowledge Discovery and Data Mining, KDD 15, pp. 1015-1024. New York, NY, USA: ACM.

Si et al. "Goal-Directed Inductive Matrix Completion". In ACM SIGKDD International Conference on Knowledge Discovery and Data Mining (KDD), pp. 1165-1174, Aug. 2016.

Steffen Rendle et al. "BPR: Bayesian Personalized Ranking from Implicit Feedback". In Proceedings of the Twenty-Fifth Conference on Uncertainty in Artificial Intelligence (UAI2009). AUAI Press, pp. 452-461.

Steffen Rendle. "Factorization Machines with libFM". ACM Transactions on Intelligent Systems and Technology, vol. 3, No. 3, Article 57 (May 2012).

Stuart E. Middleton, et al. "Ontological User Profiling in Recommender Systems." ACM Transactions on Information Systems, vol. 22, Issue I (Jan. 2004).

Tamara G. Kolda et al. "Tensor Decompositions and Applications". SIAM Rev. 51, 3 (Aug. 2009), 455-500.

Xing Yi, et al. 2014. "Beyond Clicks: Dwell Time for Personalization." In Proceedings of the 8th ACMConference on Recommender Systems (ReeSys '14). ACM, New York, NY, USA, pp. 113-120.

Yehuda Koren. "Collaborative Filtering with Temporal Dynamics". In Proceedings of the 15th ACM SIGKDD International Conference on Knowledge Discovery and Data Mining (KDD '09). ACM, New York, NY, USA, 447-456.

Yehuda Koren. "Factorization Meets the Neighborhood: A Multifaceted Collaborative Filtering Model". In Proceedings of KDD 2008. 426-434.

In .e Smart retrieval system—experiments in automatic document processing, G. Salton (Ed.). Englewood Cli.s, NJ: Prentice-Hall, 313-323.

Yue Shi, et al. 2014. "Collaborative Filtering Beyond the User-Item Matrix: A Survey of the State of the Art and Future Challenges". ACM Computing Surveys. 47, 1, Article 3 (May 2014), 45 pages.

* cited by examiner

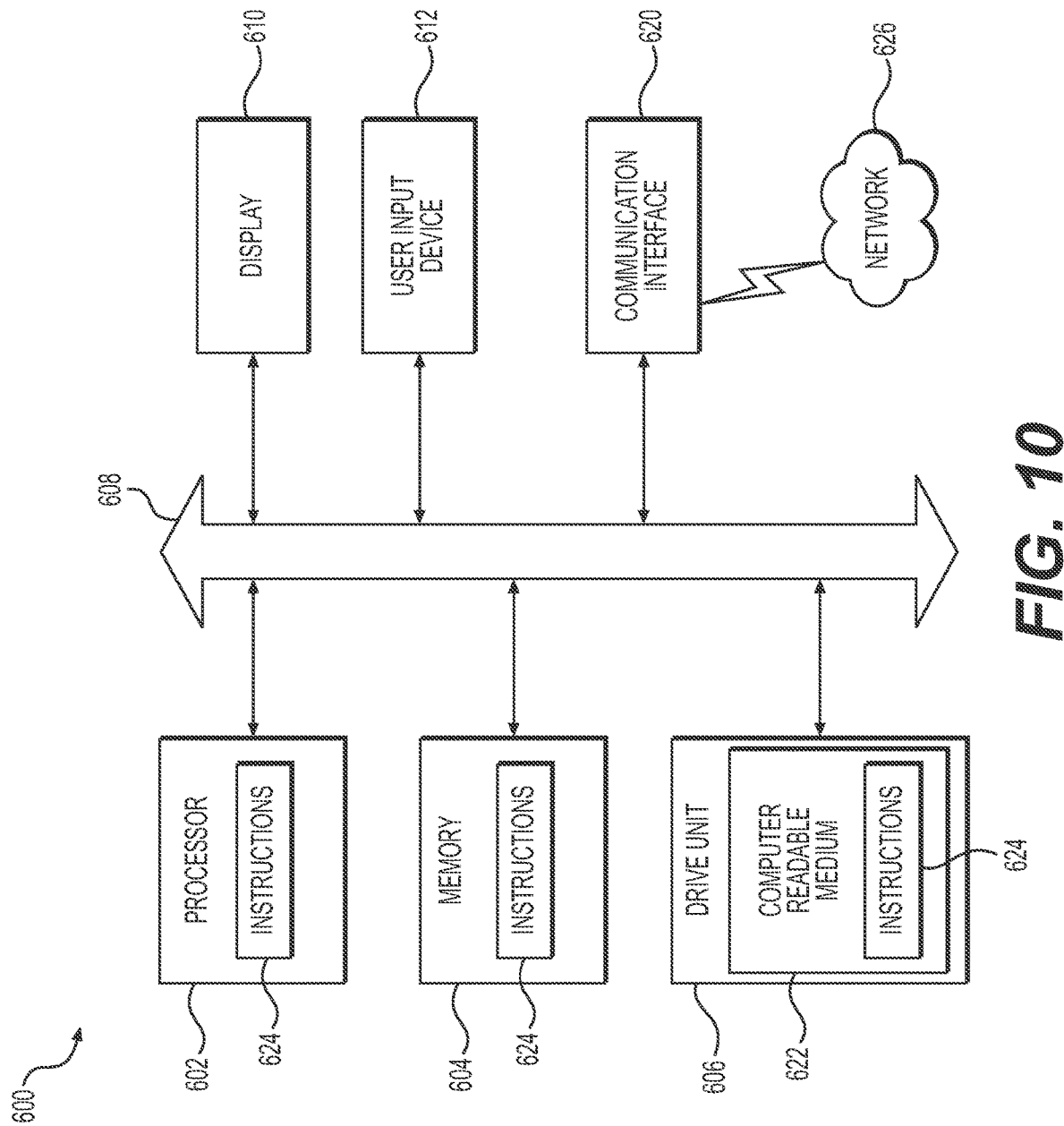

ANALYTICAL PRECURSOR MINING FOR PERSONALIZED RECOMMENDATION

TECHNICAL FIELD

The present disclosure relates to methods and systems for building electronic user profiles by relevance feedback and for discovering precursors to current user interaction events.

BACKGROUND

Online news services have dramatically changed the way people access information. Due to the great number of news sites accessible over the Web, it is problematic for normal end users to reach the desired pieces of information as quickly as possible. Users expect to be provided with content that they consider relevant, useful, or interesting. Since every single user has his/her own set of interests, personalization of presented news results is an important objective for serving end users. The ability to deliver personalized content is crucial to content platforms such as Yahoo!® News, YouTube®, Facebook®, etc.

Traditional approaches consist of ranking news articles based on how well they match the user's interests. Determining the interests of a specific user (i.e., building a user profile) is a critical aspect that heavily affects the quality of a news personalization system. While early systems explicitly asked users to specify their profiles, it is common today to develop automated user-profiling strategies that do not require any manual effort on the part of users. One of the most valuable information sources that can be used to automatically build user profiles is the online behavior exhibited by users during their interaction with online services. Also, the behavior exhibited by users may provide clues as to why a particular content item is recommended to them. Techniques for presenting such explanation has begun drawing the attention of product designers and software engineers.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

Implementations of the present disclosure provide methods and systems for building user profiles by relevance feedback, and for discovering precursors to current user interaction events.

In certain implementations, a computer-implemented method is disclosed for discovering precursors associated with a current user interaction event. The method may comprise receiving a selection of a new item by a user, determining a plurality of similarities between the new item selected by the user and a plurality of historical items, the plurality of historical items being associated with prior user activity; determining a plurality of importance weights associated with the plurality of historical items; generating at least one enhanced importance matrix based on the plurality of similarities and the plurality of importance weights; determining prior interactions of the user with the plurality of historical items; and identifying one or more precursors for the new item selected by the user based on the enhanced importance matrix and the prior interactions of the user with the plurality of historical items.

In certain implementations, a system is disclosed for discovering precursors associated with a current user interaction event. The system may comprise one or more processors; and a non-transitory computer readable medium storing instructions that, when executed by the one or more processors, cause the one or more processors to perform a method comprising: receiving a selection of a new item by a user, determining a plurality of similarities between the new item selected by the user and a plurality of historical items, the plurality of historical items being associated with prior user activity; determining a plurality of importance weights associated with the plurality of historical items; generating at least one enhanced importance matrix based on the plurality of similarities and the plurality of importance weights; determining prior interactions of the user with the plurality of historical items; and identifying one or more precursors for the new item selected by the user based on the enhanced importance matrix and the prior interactions of the user with the plurality of historical items.

In certain implementations, a non-transitory computer-readable medium is disclosed for discovering precursors associated with a current user interaction event. The non-transitory computer readable medium may store instructions that, when executed by one or more processors, cause the one or more processors to perform a method comprising: receiving a selection of a new item by a user, determining a plurality of similarities between the new item selected by the user and a plurality of historical items, the plurality of historical items being associated with prior user activity; determining a plurality of importance weights associated with the plurality of historical items; generating at least one enhanced importance matrix based on the plurality of similarities and the plurality of importance weights; determining prior interactions of the user with the plurality of historical items; and identifying one or more precursors for the new item selected by the user based on the enhanced importance matrix and the prior interactions of the user with the plurality of historical items.

Additional objects and advantages of the disclose implementations will be set forth in part in the description that follows, and in part will be apparent from the description, or may be learned by practice of the disclosed implementations. The objects and advantages of the disclosed implementations will be realized and attained by means of the elements and combinations particularly pointed out in the appended claims.

It is to be understood that both the foregoing general description and the following detailed description are exemplary and explanatory only and are not restrictive of the disclosed implementations, as claimed.

BRIEF DESCRIPTION OF THE DRAWINGS

The accompanying drawings, which are incorporated in and constitute a part of this specification, illustrate various exemplary implementations and together with the description, serve to explain the principles of the disclosed implementations.

FIG. 10 illustrates an implementation of a general computer system, according to one implementation of the present disclosure.

DETAILED DESCRIPTION

Figure 1:
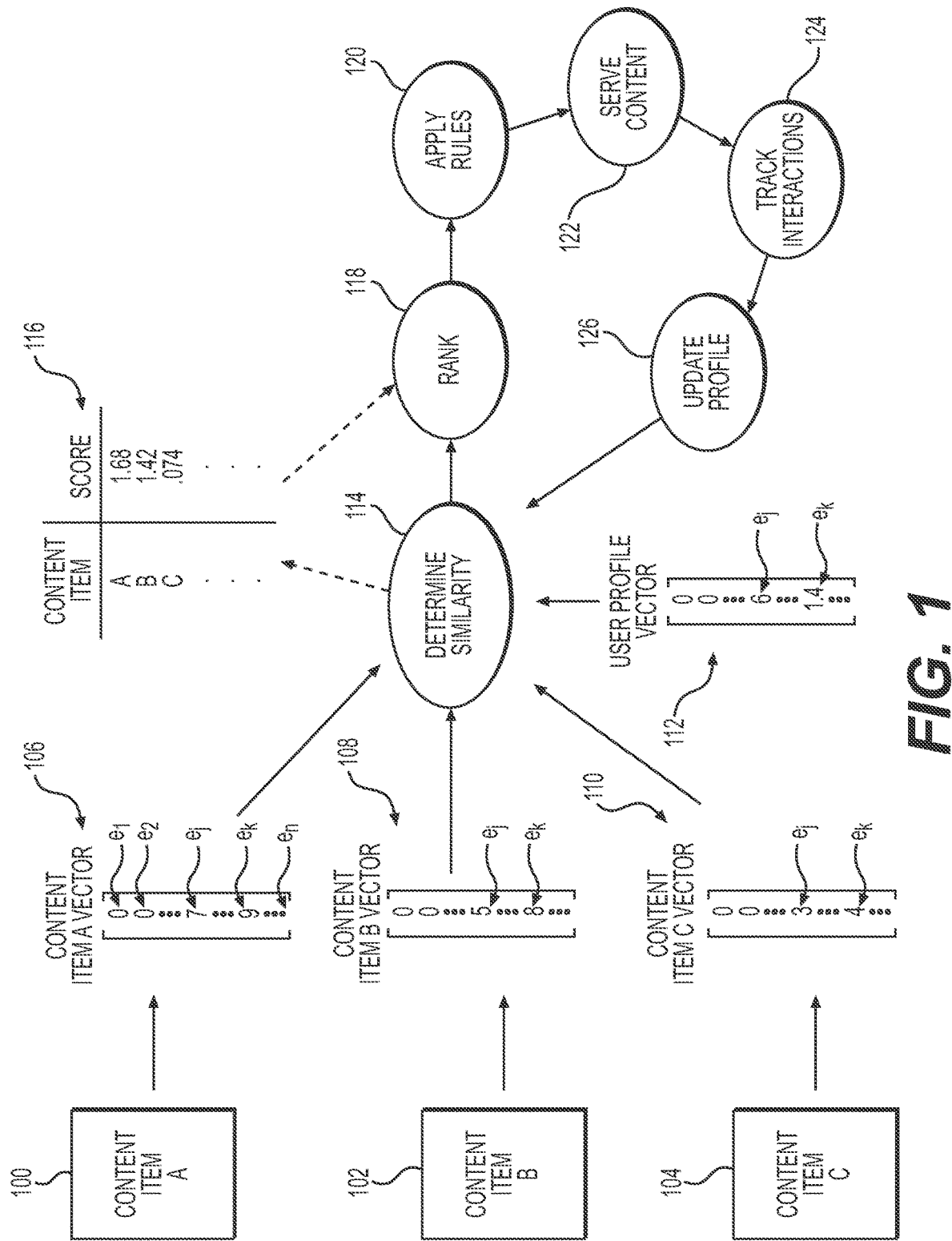
FIG. 1 conceptually illustrates a process for serving content items to a user based on the user's profile, according to one implementation of the present disclosure.

The following implementations describe systems and methods for building user profiles using relevance feedback and discovering precursors for current user interaction events. It will be apparent, however, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific example implementations. Subject matter may, however, be embodied in a variety of different forms and, therefore, covered or claimed subject matter is intended to be construed as not being limited to any example implementations set forth herein; example implementations are provided merely to be illustrative. Likewise, a reasonably broad scope for claimed or covered subject matter is intended. Among other things, for example, subject matter may be embodied as methods, devices, components, or systems. Accordingly, implementations may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one implementation" as used herein does not necessarily refer to the same implementation and the phrase "in another implementation" as used herein does not necessarily refer to a different implementation. It is intended, for example, that claimed subject matter include combinations of example implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

User Profile Modeling

Modeling of user interest profiles is one important component of a content recommendation system. A user profile can be built using the features of the content items that the user has interacted with. Examples of content features for news items can be topics of news articles. The feature space of the user profile is then the same as the space of content features, and a given feature value in the user profile indicates the relevance of the content feature to the user. At the time of serving content items to users, the relevance between a user and a given content item can be measured based on the similarity between the user's profile and the content features of the given content item.

One solution to building profiles is to combine all features of items clicked by the user using certain statistical models. This is based on the assumption that if a user interacts a lot with content items containing a specific feature, that feature may be highly relevant to this user and the user is likely to read other items that contain the feature as well. A user interest profile can then be represented as a vector over content features.

Another statistical method is derived from the Chi-Square test. The concept is to select those features that have much higher values for the user as compared to the expected value. This means that if one user reads items containing a specific feature at a rate that is statistically significantly above the average rate for that feature, that feature will be included in the user interest profile.

While generative statistical models are sensible and possible to compute, these methods typically only use positive feedback signals. By not taking into account features appearing in content items with negative feedback, such user profiles can misrepresent the relevance of the feature to the user. In other words, these models lack the ability to represent discriminative user interests.

Thus, in order to quickly build user profiles that contain discriminative user interest features, implementations of the present disclosure model a users' interest using both positive and negative feedback on items. More specifically, in some implementations, the history of click or skip feedback for each user on displayed items is used to construct the training data for that user, where each item is a feature vector with labels, click or skip. Furthermore, time-decay factors are taken into account so that the system can keep track of changes in the users' interest. Changes in the feature (topic) values in the user profile indicate that the relevance of topics to the user is changing. New features (topics) can be added into the user profile, and old topics can also be removed based on the user's interactions with the content items.

The feedback can be explicit, e.g. in the form of ratings or binary preference indicators, or implicit, e.g. inferred from the user's interaction with the content item. As with explicit interest declarations, assuming the presence of explicit feedback is not always feasible. On the other hand, there is a rich set of implicit feedback that can be obtained from the user's behavior in relation to a content item. As an example, a user can indicate a positive preference by clicking on an item or dwelling on it beyond a threshold amount of time, while negative feedback can be inferred/construed from a lack of a click or very low time spent on an item (e.g. less than a threshold amount of time). Given the user feedback on a set of content items, it is possible to characterize or build a profile for the user.

An advantage of building such user interest profiles is that such a method suffers less from the item cold-start case. That is, even if the user is the very first person to interact with that item, it can be deemed relevant to the user based on an overlap in the user interest profile and the item's features. Examples of content features for news items can include topics of the content item. Such profile building methods can be built from a combination of explicit, implicit, positive and/or negative feedback from the user. However, there are also several challenges to building an effective user profile in an expedient manner.

For example, there can be multiple types of user feedback interactions occurring between users and items that go beyond clicks. Users may show interest in a topic in one item while skipping the same topic in other items. In particular, signals that can be considered as negative feedback of the users are of great value, since they improve the discriminative ability of user profiles. Very few content personalization solutions explicitly model the wealth of information in implicit negative feedback from users. Hence, one challenge is how to effectively exploit the complex implicit feedback data for modeling user profiles.

The time-varying nature of a user's interest also presents challenges. A user's interest may change based on contextual information. A user may have different topical interests on weekdays versus weekends. She may change her interest according to seasonal events. To capture users' interests precisely and quickly, implementations of the disclosure consider a time-decay factor.

Another challenge is scalability. Personalized recommendation is by default a task at very large scale, since online companies may serve millions of users and items every day. In addition, the content features, based on which the user profiles are built, likely lie in a very high dimensional space, e.g., documents can be represented by thousands of topics. As a result, building profiles for individual users requires computation over a massive feature space. Furthermore, in order to stay current with the user's time-varying interests as noted above, users' profiles should be periodically updated or re-determined within short timeframes, thereby magnifying the scalability issue. In sum, it is challenging to provide a computationally efficient method of building user profiles that also fulfills the goals of high personalization (and discriminative utility) and time sensitivity.

Implementations of the present disclosure provide solutions to the aforementioned challenges and address the drawbacks of prior art approaches. In some implementations, a specialized case of the presently described approach uses the Rocchio algorithm, which is a relevance feedback procedure used in information retrieval. Implementations of the present disclosure make use of relevance feedback to build user profiles that can then be used to retrieve relevant content items for the user. Unlike conventional approaches that build user profiles based on only positive implicit feedback, such as click events, implementations of the present disclosure exploit the rich and complex signals that are present in the negative feedback of users with respect to content items. By incorporating both positive and negative user feedback and a time-decay factor, it is possible to build user interest profiles that are discriminative and more effective than conventional approaches.

According to one aspect of the present disclosure, an approach to building user profiles is summarized below. A special version of such a method is analogous to the Rocchio algorithm, which is used to refine a user query based on retrieved documents in information retrieval.

As discussed above, a typical desirable profile model should capture time-varying aspects of user's interests and build user profiles precisely and quickly.

Generally, user profile modeling in a content recommendation system aims to represent user interests in the same space as that of the content features in order to effectively retrieve content items that are relevant to the user. The user profiling problem can be formally defined as follows:

A user profile $P_t$ at time $t$ is a function $f$ that maps the user profile $P_{t-1}$ created at time $t-1$ and the clicks and skips observed at time $t$, click($t$) and skip($t$). To build an initial user profile, only click($t$) and skip($t$) are used.

$$P_t = f(P_{t-1}, \text{click}(t), \text{skip}(t))$$

Function $f$ can be learned from the user's current profile and the history of the user's behavior. It can be expressed in different models and may be a linear function, which turns out to be analogous to the Rocchio algorithm.

Using the generative statistical model described before as a base line, experiments using such a linear function demonstrated performance better than the baseline by over 7%.

The Rocchio algorithm is a relevance feedback procedure used in information retrieval. It designed to produce improved query formulations following an initial retrieval operation. The Rocchio feedback approach was developed using the Vector Space Model. The algorithm is based on the assumption that most users have a general conception of which documents should be denoted as relevant or nonrelevant. By using the Rocchio algorithm, the original query is moved closer to the centroid of relevant documents and away from the centroid of non-relevant documents. The importance of relevant and non-relevant documents allowed to refine a query is dictated by the weights of the alpha, beta, and gamma variables described below. A method analogous to the Rocchio algorithm is used in some implementations of the present disclosure to model user profiles based on user relevance feedback.

$$P_t = \text{alpha} * P_{t-1} + \text{beta} * \text{Mean}(\text{relevant}(t)) + \text{gamma} * \text{Mean}(\text{nonrelevant}(t))$$

As demonstrated in the Rocchio formula, the associated weights (alpha, beta, and gamma) are responsible for shaping the modified user profile vector in a direction closer, or farther away, from the original profile, related documents, and non-related documents.

User profiles ($P_t$ and $P_{t-1}$), relevant documents, relevant($t$), and non-relevant documents, nonrelevant($t$)), are all modeled as vectors in the same concept space. Relevant documents are those for which users showed interest (e.g. clicked documents), while non-relevant documents are those which users skipped. Mean(relevant($t$)) and Mean(nonrelevant($t$)) are the centroids of the relevant document vectors and non-relevant document vectors, respectively.

The inner product between user profiles and item features is used to obtain the relevance score for the ranking model. To guarantee efficiency the values of alpha, beta, and gamma can be optimized to achieve the best ranking of documents for a given objective for a given user profile.

FIG. 1 conceptually illustrates a process for serving content items to a user based on the user's profile, according to one implementation of the present disclosure. Broadly speaking, implementations of the disclosure relate to a content recommendation system that recommends content items to users based on their user profiles, and further updates their user profiles based on both positive and negative feedback on the content items that have been provided to the users. A content item can be any type or unit of electronic content that can be provided over an electronic network, and rendered on a client device operated by the user. Examples of content items include by way of example without limitation, electronic articles (e.g. news, editorials, non-fiction, fiction, etc.) displayed via websites or mobile applications, videos, images, audio, advertisements, and any other type of content that can be transmitted over an electronic network for consumption by an end user. Content items may also include previews of such content, and in some implementations, a given content item and its preview may be used and/or considered interchangeably, as for example, an interaction with a preview of a content item can be considered as an interaction with the content item for purposes of determining/updating the user profile according to one implementation of the present disclosure.

In the illustrated implementation, content items A, B, and C (refs. 100, 102, 104, respectively) are conceptually illustrated. It will be appreciated that there may be any number of content items in various implementations. In a content recommendation system such as a news recommendation system, there can be thousands or even hundreds of thousands of content items, by way of example without limitation. Each content item has an associated content item vector. In the illustrated implementation, the content item A has a content item A vector (ref. 106), the content item B has a content item B vector (ref. 108), the content item C has a content item C vector (ref. 110). A given content item vector define values indicating the relevance of a given content item to various entities. Examples of entities include any topics, persons, places, things, events, tags, keywords, etc. That is, entities are any subject to which a given content item may be relevant. In some implementations, a corpus of entities can be used to define the available entities, which are represented by a vector. Examples include, by way of example without limitation, Wikipedia entities, the Yahoo! Content Taxonomy, etc. It will be appreciated that the number of possible entities defines the dimensional size of the vector space in which the content items are given vector representations (content item vectors). That is, in some implementations, the dimension of the content item vectors is defined by the number of possible entities. There can be any number of possible entities in various implementations. In some implementations, the dimension of a given content item vector is greater than one thousand; in some implementations, the dimension of a given content item vector is greater than 100,000. In some implementations, the dimension of a given content item vector is on the order of approximately 400,000.

With continued reference to FIG. 1, in the illustrated implementation, the content item A vector includes fields for entities e1 to en. The values for a given entity indicates the relevance of the given content item to that given entity (e.g. the extent to which the given content item is "about" the given entity). In some implementations, a value of zero indicates no relevance, and increasingly positive values indicate increasing amounts of relevance. In some implementations, the values for most entity fields is likely to be zero, and therefore, in some implementations, content item vectors are stored in a manner such that only the positive entity values are stored, and the remaining field values need not be specifically stored, as they are known to be zero, which can be determined and/or generated when needed for processing.

In some implementations, the specific vector encoding for a given content item can be determined using machine learning methods. Examples of methods for encoding the vector representations of content items are described, by way of example without limitation, in U.S. patent application Ser. No. 15/471,455, filed Mar. 28, 2017, entitled "Multilabel Learning Via Supervised Joint Embedding of Documents and Labels," the disclosure of which is incorporated by reference herein.

In the illustrated implementation, the content item A vector defines a value of 0.7 for entity ej, and a value of 0.9 for entity ek; the content item B vector defines a value of 0.5 for entity ej, and a value of 0.8 for entity ek; the content item C vector defines a value of 0.3 for entity ej, and a value of 0.4 for entity ek.

For a given user, a user profile vector (ref. 112) is defined, that is encoded in the same vector space as the content item vectors. That is, the user profile vector has the same dimensionality and defines values for the same set of entities as the content item vectors. However, the values defined by the user profile vector indicate the relevance of the entities to the given user (or rather, the relative amounts of preference or interest of the user in the various entities).

To determine the (expected) relevance of a given content item to the user, the similarity of the content item's vector representation to the user profile vector is determined (ref. 114). In some implementations, this is performed by determining the inner product of the content item's vector and the user profile vector to arrive at a relevance score. In the illustrated implementation, the inner product of the user profile vector (ref. 112) and each of the content item A/B/C vectors yields the relevance scores for the content items A, B and C as shown at ref. 116.

The relevance scores can be used to rank the content items according to relevance to the user. In the illustrated implementation, a higher score indicates greater relevance to the user. Based on the content items' rankings, one or more of the content items are presented to the user (ref. 122), e.g. by transmitting the one or more content items over a network to the client device for rendering thereon. In some implementations, the highest ranking content items are presented to the user. In some implementations, the ranking of the content items is used to determine the order in which the content items are presented to the user.

In some implementations, factors in addition to the ranked order of the content items are considered before serving content items. For example, in some implementations, one or more rules are applied (ref. 120), e.g. to affect/alter the rankings or supersede the rankings, before content items are served. By way of example without limitation, there may be a rule to prevent too many content items of a same or similar type (e.g. as determined from their respective vector representations) from being presented at the same time or in rapid succession, a rule to insert a specific content item at a particular location and/or time, etc.

After the selected content items are served to the user, then the user's interactions with the selected content items are tracked (ref. 124). The tracked interactions can be processed as positive feedback, indicating relevance of the content item and its associated entities to the user, and negative feedback, indicating non-relevance of the content item and its associated entities to the user. This information can be used to update the user's profile vector (ref. 126), as described in further detail below. It will be appreciated that the updated user profile is then utilized for subsequent similarity and ranking operations to determine which content items will be served to the user in the future.

Figure 2:
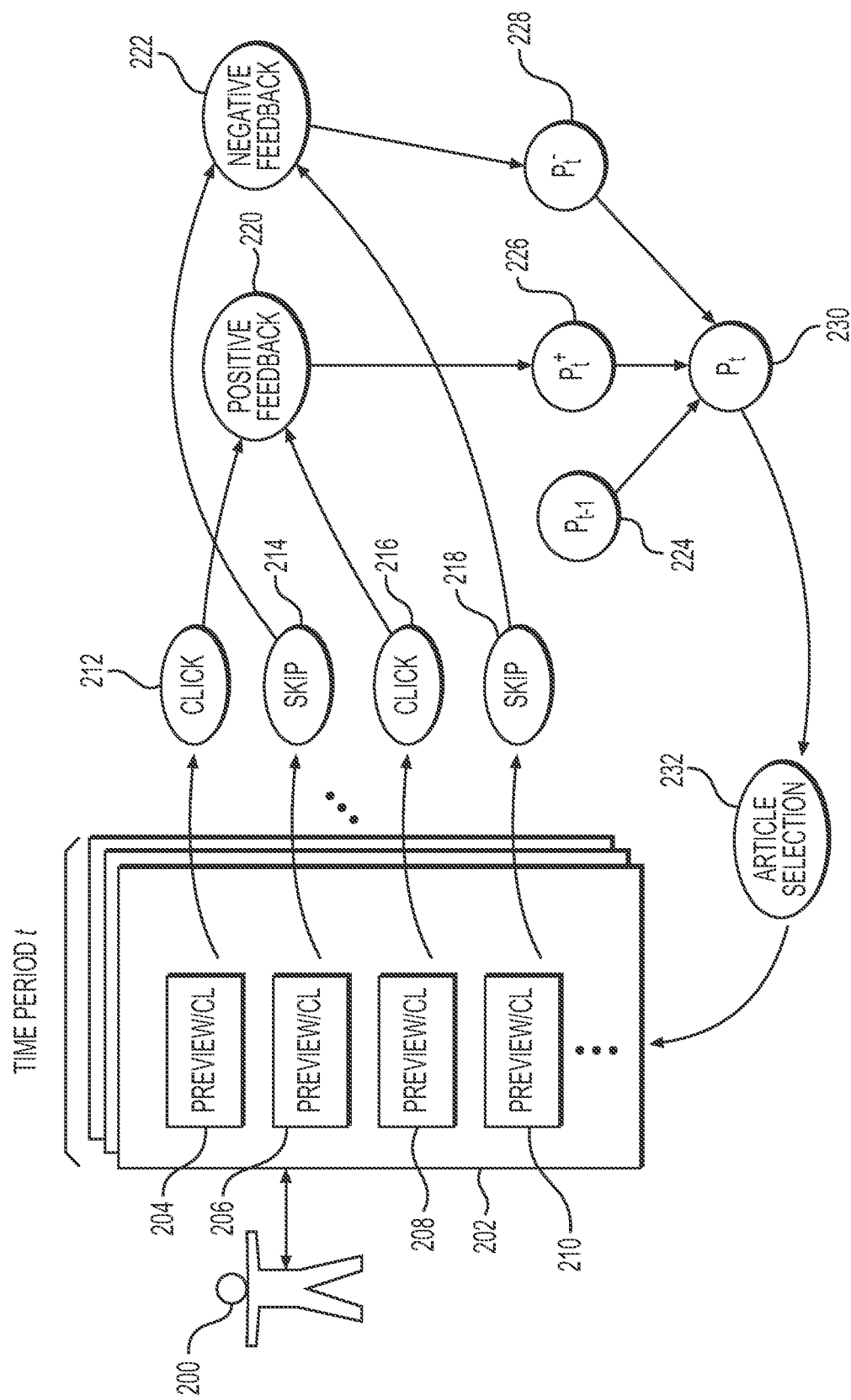
FIG. 2 conceptually illustrates a process for determining a user profile, according to one implementation of the present disclosure.

FIG. 2 conceptually illustrates a process for determining a user profile, according to one implementation of the present disclosure. In the illustrated implementation, the user 200 interacts with content items over a current time period t, that are presented through a content presentation context 202. The content presentation context 202 is any kind of context or vehicle through which the content items can be presented to the user. Examples include, by way of example without limitation, a web page, an application/app, a social media feed, a news feed, etc.

In the illustrated implementation, the user 200 interacts with the content items 204, 206, 208, and 210. As shown, the user clicks on content items 204 and 208. These click interactions (ref. 212 and 216) are registered as positive feedback/interactions on the content items 204 and 208. Whereas the user skips content items 206 and 210. These skip interactions (ref. 214 and 218) are registered as negative feedback/interactions on the content items 206 and 210.

It will be appreciated that in some implementations, the content items are previews, which when clicked, cause presentation of the full versions of their respective content items.

The positive interactions are encoded into a positive interaction vector Pt+ (ref. 226). In some implementations, this is performed by determining the mean of the content item vectors for the content items that received positive interactions (e.g. clicks) during the time period t. Similarly, the negative interactions are encoded into a negative interaction vector Pt− (ref. 228). In some implementations, this is performed by determining the mean of the content item vectors for the content items that received negative interactions (e.g. skips) during the time period t.

In some implementations, if positive interactions (e.g. clicks, dwell time greater than or equal to a predefined threshold, etc.) are recorded for m content items having corresponding vectors Vi, then the positive interaction vector Pt+ can be calculated as follows:

$$P_t^+ = \frac{1}{m}\sum_{i=1}^{m} V_i$$

Conceptually, this can be understood as determining the centroid of the vector representations of the content items for which the user exhibited positive interactions.

Similarly, in some implementations, if negative interactions (e.g. skips, dwell time less than or equal to a predefined threshold, etc.) are recorded for n content items having corresponding vectors Wi, then the negative interaction vector Pt− can be calculated as follows:

$$P_t^- = \frac{1}{n}\sum_{i=1}^{n} W_i$$

Conceptually, this can be understood as determining the centroid of the vector representations of the content items for which the user exhibited negative interactions.

In view of the above, an updated user profile vector can be determined as a function of the previous user profile vector Pt−1 from a preceding time period t−1, the positive interactions as represented by the positive interaction vector, and the negative interactions as represented by the negative interaction vector. In some implementations, the updated user profile vector for the current time period t is determined as follows:

$$P_t = f(P_{t-1}, P_t^+, P_t^-)$$

It will be appreciated that the function f can take various forms. In some implementations, the function f is learned from the user's current profile and the history of the user's behavior. In some implementations, the updated user profile vector Pt is determined according to a linear function as follows:

$$P_t = \alpha(P_{t-1}) + \beta(P_t^+) + \gamma(P_t^-)$$

The parameters $\alpha$, $\beta$, and $\gamma$ are tuning parameters/weights that can be tuned to determine the extent to which the updated user profile is determined by each of the previous profile vector, the positive interaction vector, and the negative interaction vector.

The parameter $\alpha$ has a value between zero and one, and determines the extent to which the previous user profile vector influences the current user profile vector. Furthermore, by setting the parameter $\alpha$ to a value between zero and 1, the parameter $\alpha$ also controls the decay of the influence of a previous user profile vector for purposes of determining a current user profile vector. That is, as the parameter $\alpha$ decreases, so the influence of the previous profile vector is not only reduced for purposes of determining the updated profile vector, but also increases the rate of decay of the previous profile vector's influence in subsequent profile updates. This can be conceptually understood when considering that for a future time period t+1, the user profile is determined as follows:

$$\begin{aligned}P_{t+1} &= \alpha(P_t) + \beta(P_{t+1}^+) + \gamma(P_{t+1}^-) \\ &= \alpha(\alpha(P_{t-1}) + \beta(P_t^+) + \gamma(P_t^-)) + \\ &\quad \beta(P_{t+1}^+) + \gamma(P_{t+1}^-) \\ &= \alpha^2(P_{t-1}) + \alpha\beta(P_t^+) + \alpha\gamma(P_t^-) + \\ &\quad \beta(P_{t+1}^+) + \gamma(P_{t+1}^-)\end{aligned}$$

Thus, it can be seen that whereas the influence of the previous user profile vector Pt−1 is defined by a at time t, it is defined by $\alpha 2$ at time t+1, by $\alpha 3$ at time t+2, and so forth. Thus, there is an exponential decay of the previous user profile vector that is defined by parameter $\alpha$.

The parameters $\beta$ and $\gamma$ determine the influence of the positive and negative interaction vectors, respectively, on determining the updated user profile vector. In other words, they determine the extent to which the updated user profile is determined by the positive and negative interactions occurring during the current time period t. The parameter $\beta$ will have a positive value that enables additive emphasis of features of content items with which positive interactions were recorded. However, the parameter $\gamma$ will have a negative value, so as to de-emphasize features of content items with which negative interactions were recorded.

In various implementations, the time period t can define any period of time, including by way of example without limitation, one or more days, one or more weeks, one or more months, etc. It will be appreciated that the time period defines how often the user profile is updated. In some implementations, the time period t is defined by recording of a predefined number of interactions (positive or negative)

with content items. In this manner, then the user profile is not updated until a sufficient number of interactions has been recorded since the last time the user profile was updated.

While implementations have been described with reference to clicks and skips as types of positive and negative interactions, it will be appreciated that in other implementations, positive interactions may include any type of interaction with a content item that indicates its relevance to the user, and negative interactions may include any type of interaction with a content item that indicates its non-relevance to the user. In some implementations, positive interactions include dwell time (time spent by a user viewing a given content item) greater than (or equal to) a predefined threshold, and negative interactions include dwell time less than (or equal to) a predefined threshold. Other examples of positive interactions can include social signals such as commenting on a content item, sharing of a content item (e.g. over a social network), indicating a reaction to a content item on a social network (e.g. thumbs up, like, etc.), and other types of interactions that indicate user engagement with a content item.

In some implementations, the specific values of the parameters $\alpha$, $\beta$, and $\gamma$ can be optimized for one or more goals, such as maximizing user engagement (e.g. maximizing dwell time, and/or other positive interaction indicators), maximizing revenue (e.g. generated from advertising), etc. In some implementations, the values of the parameters $\alpha$, $\beta$, and $\gamma$ can be optimized/determined using a machine learning technique (e.g. a neural network, etc.).

It will be appreciated that initially, there may be no previous user profile vector for a brand new user. In this case, then the first user profile vector will be determined by only the positive and negative interaction vectors, which are determined from the positive and negative interactions occurring over the current time period. After this first user profile vector is determined, then it is used to determine a subsequent user profile vector in a subsequent time period, per the above.

In some implementations, the value of the parameter $\alpha$ is in the range of about 0.5 to 0.9; in some implementations, $\alpha$ is in the range of about 0.7 to 0.9; in some implementations, a is approximately 0.8.

In some implementations, the value of the parameter $\beta$ is in the range of about 0.5 to 1.5; in some implementations, $\beta$ is in the range of about 0.7 to 1.2; in some implementations, $\beta$ is approximately 1.0.

In some implementations, the value of the parameter $\gamma$ is in the range of about −1.5 to −0.5; in some implementations, $\gamma$ is in the range of about −1.2 to −0.7; in some implementations, $\gamma$ is approximately −0.9.

Figure 3:
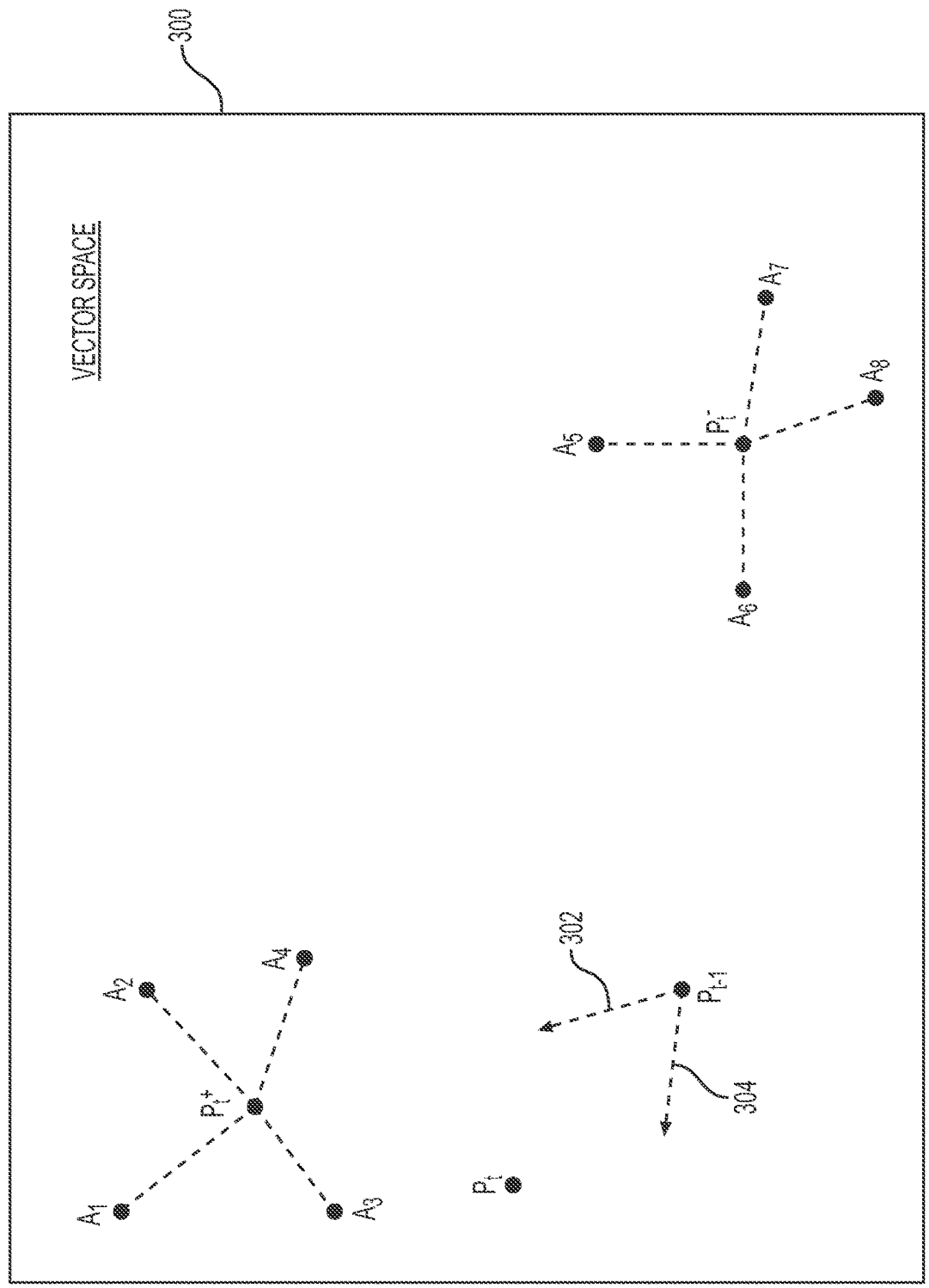
FIG. 3 conceptually illustrates determination of a user profile vector in a vector space, according to one implementation of the present disclosure.

FIG. 3 conceptually illustrates determination of a user profile vector in a vector space, according to one implementation of the present disclosure. In the illustrated implementation, a vector space 300 is shown, in which content item vectors are defined. During a current time period t, a given user exhibits positive interactions with content items having vector representations A1, A2, A3, and A4, and the given user exhibits negative interactions with content items having vector representations A5, A6, A7, and A8. The positive interaction vector Pt+ is determined as the centroid of the content item vectors A1, A2, A3, and A4. The negative interaction vector Pt− is determined as the centroid of the content item vectors A5, A6, A7, and A8.

The user also has a previous user profile vector Pt−1 from a previous time period t−1. In order to update the user profile vector for the current time period t, the previous user profile vector Pt−1, the positive interaction vector Pt+, and the negative interaction vector Pt− are combined to adjust the user profile vector so that it moves towards the centroid of the content items with which the user exhibited positive interactions (ref. 302), and moves away from the centroid of the content items with which the user exhibited negative interactions (ref. 304), to define the current user profile vector Pt for the current time period.

Figure 4:
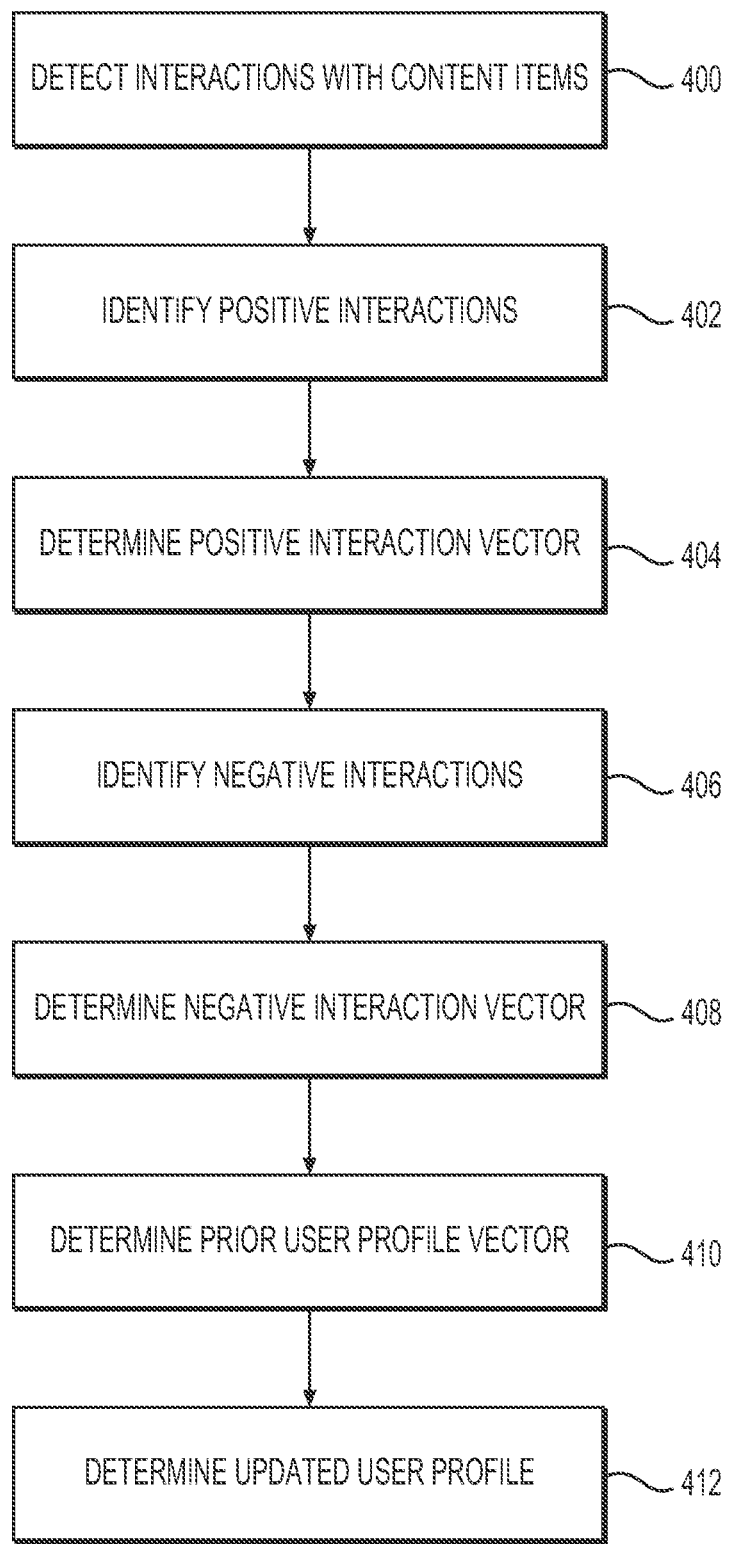
FIG. 4 illustrates a method of updating a user profile, according to one implementation of the present disclosure.

FIG. 4 illustrates a method of updating a user profile, according to one implementation of the present disclosure. At method operation 400, interactions by a user with content items are detected. At method operation 402, positive interactions with content items are identified, and at method operation 404, a positive interaction vector is determined from the identified positive interactions. At method operation 406, negative interactions with content items are identified, and at method operation 408, a negative interaction vector is determined from the identified negative interactions. At method operation 410, a prior user profile vector is determined, the prior user profile vector being determined from a preceding time period. At method operation 412, an updated user profile vector is determined using the prior user profile vector, the positive interaction vector, and the negative interaction vector.

Figure 5:
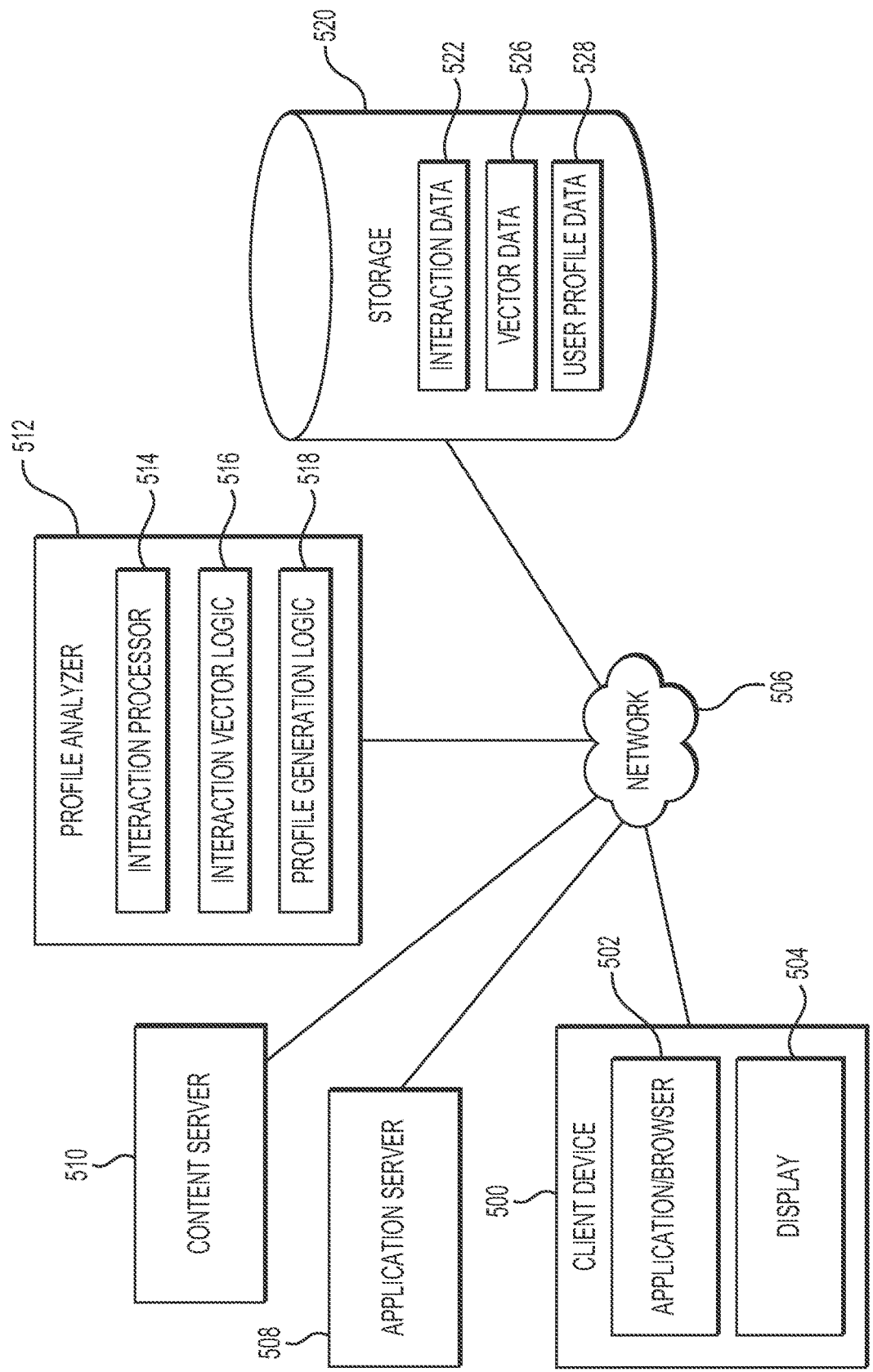
FIG. 5 illustrates a system for providing content to users based on user profiles, according to one implementation of the present disclosure.

FIG. 5 illustrates a system for providing content to users based on user profiles, according to one implementation of the present disclosure. Broadly speaking, the system can be configured to perform any of the methods for generating and using user profiles to provide content over a network described in accordance with implementations of the present disclosure. A client device 500 is operated by a user to access a content site or platform, which in various implementations may be a social content/networking/sharing site, an e-commerce site, a news site, forum site, blogging site, etc. The client device 500 executes an application 502 (which in some implementations, may be a browser application or a web application) that is configured to render to the display 504 of the client device 500 an interface for interacting with the content site. The application 502 may communicate over a network 506 (e.g. the Internet) with an application server 508 to obtain data so that the user may access the content site, including accessing specific content, topics/categories, a personalized feed, etc.

It will be appreciated that in some implementations, content can be obtained from a separate content server 510 for rendering in the context of the interface that is rendered on the client device 500. For example, a preview of a piece of content (e.g. an article from a third-party news source) may be provided, and accessing the article may redirect to obtain the full content from the content server 510 (e.g. the content server of the third-party news source).

A profile analyzer 512 is configured to determine user profiles in accordance with the methods disclosed herein. The profile analyzer 512 includes interaction processor 514 that is configured to process user interactions with content, stored as interaction data 522 in storage 520, to identify positive and negative interactions in accordance with the methods described above.

The profile analyzer 512 further includes interaction vector logic 516 that is configured to process the positive and negative interactions to determine positive and negative interaction vectors, as described above. As has been described, this may entail processing content item vectors, which are stored as vector data 526. The resulting vector representations of the positive and negative interactions can also be stored as part of vector data 526. The profile analyzer 512 further includes profile generation logic 518 that is configured to generate user profiles in accordance with implementations described above. The user profiles thus defined can be stored as user profile data 528.

It will be appreciated that the user profile data 528 can be used by the application server 508 or content server 510 to recommend content in response to a user request, such as a search query or a request to view a given webpage. In some implementations, this may entail ranking content or results based on a given user's user profile to determine the order in which such content will be presented to the user.

Precursor Mining

In any modern online content serving platform, it is important and challenging to not only recommend personalized items but also provide related historical events as precursors to those recommended personalized items. Precursor events help users (as well as editors and computers) to understand why the users are seeing specific content and also help engineers to explain the story behind each user interaction to improve the system. Recommendation approaches summarize as content-based methods, user profiling, and collaborative filtering, while none of these approaches satisfies the goal of explanation. One of the most valuable information sources used in this scenario is again the behavior exhibited by users during their interaction with online services. The approach disclosed herein not only recommends personalized content but also discovers precursors for recommendations based on matrix completion techniques.

In the context of the disclosed precursor mining technique, precursors may be content items that are previously selected or viewed by one or more users, or any information or data that is associated with such content items, which may reveal why a certain content item is currently selected or viewed and/or which content items contributed to the user(s) viewing or selecting the current content item. Any given precursor may be an electronic document, text file, web page, picture, audio, video, multimedia content, or any other electronic item that contains identifiable features.

Figure 6:
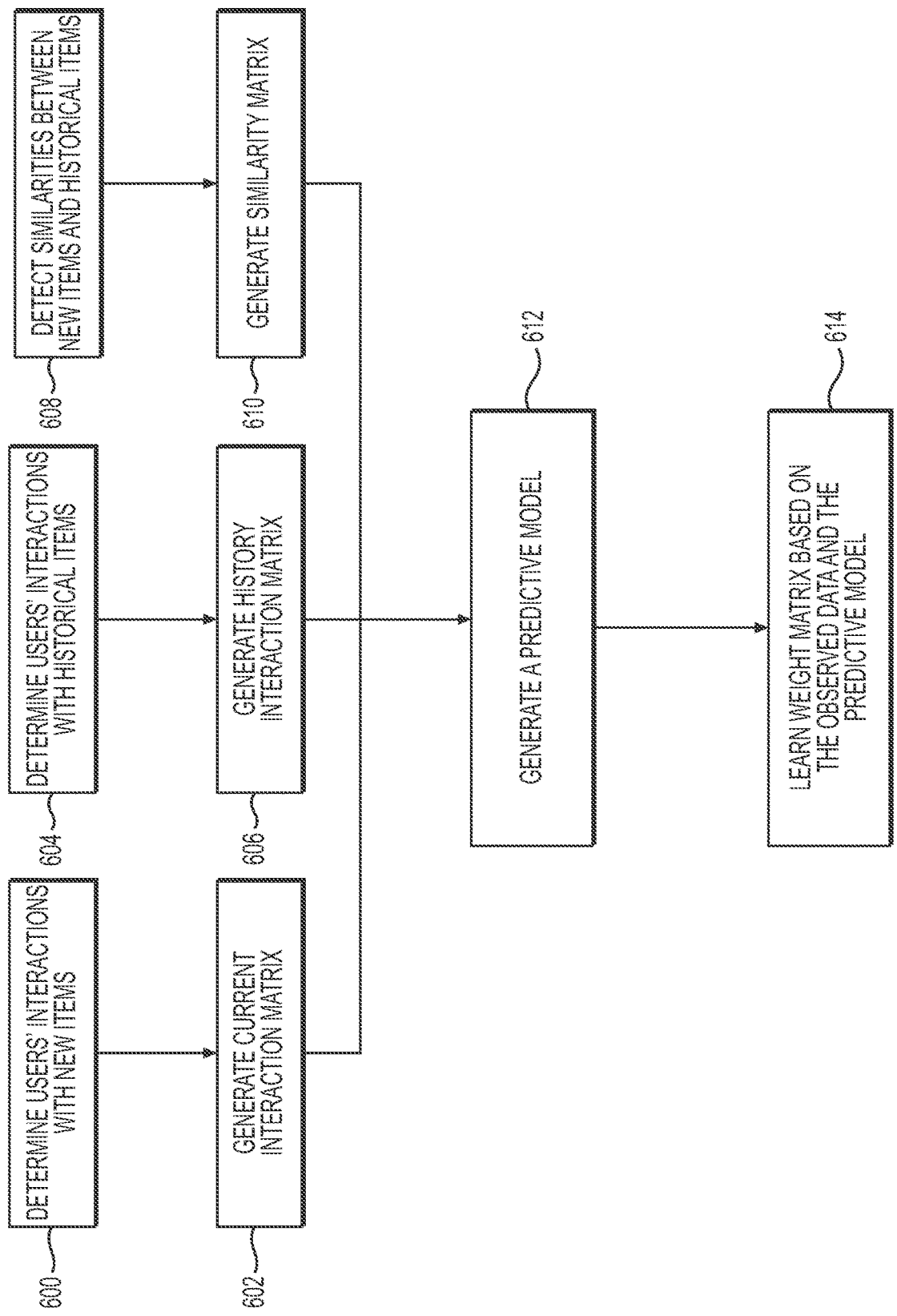
FIG. 6 illustrates a method of building and training a predictive model for mining precursors for personalized content recommendations, according to one implementation of the present disclosure.

FIG. 6 illustrates a method of building and training a predictive model using "inductive matrix completion" for mining precursors for personalized content recommendations. The proposed model studies the relationship between users' history data and their current data in a collective way for predicting the actions on new item. Furthermore, the model discovers the importance of a user's historical items to find precursors.

Table 1 below lists different notations used in describing the proposed model:

TABLE 1

| Symbol | Meaning |
|---|---|
| U | number of users |
| N | number of historical items |
| T | number of new items |
| $C_{T \times U}$ | Current Interaction Matrix |
| $H_{N \times U}$ | History Interaction Matrix |
| $S_{T \times N}$ | Similarity Matrix |
| $P_{T \times U}$ | Prediction Matrix |

At method operation 600, users' current interactions with new items are determined. The determined current interactions comprise both positive and negative current interactions, the positive current interactions indicating engagement by users with the new items (e.g., click, dwell time longer than a predetermined threshold), and negative current interactions indicating lack of engagement by the users with the new items (e.g., skip, dwell time less than a predetermined threshold). At method operation 602, a current interaction matrix (C), $C_{T \times U}$, is generated based on the determined current interactions. Within $C_{T \times U}$, each entry $C_{i,u}$, indicates the current action (e.g., click or skip) of a user u on a new item i.

At method of operation 604, users' prior interactions with historical items (also referred to as and used interchangeably with "old items" in this disclosure) are determined. The determined prior interactions comprise both positive and negative prior interactions, the positive prior interactions indicating engagement by users with the historical items (e.g., click, dwell time longer than a predetermined threshold), and negative prior interactions indicating lack of engagement by the users with the historical items (e.g., skip, dwell time shorter than a predetermined threshold). At method operation 606, a history interaction matrix (H), $H_{N \times U}$, is generated based on the detected prior interactions. Within $H_{N \times U}$, each entry $H_{j,u}$ indicates the prior action (e.g., click or skip) of a user u on an historical item j.

At method operation 608, similarities between the new items and the historical items are determined. For instance, the similarities can be determined by comparing the content features of the new items with the content features of the historical items. At method operation 610, a similarity matrix (S), $S_{T \times N}$, is generated based on the determined similarities. Within $S_{T \times N}$, each entry $S_{i,j}$ represents the similarity between a new item i in $C_{T \times U}$ and an historical item j in $H_{N \times U}$.

Figure 7:
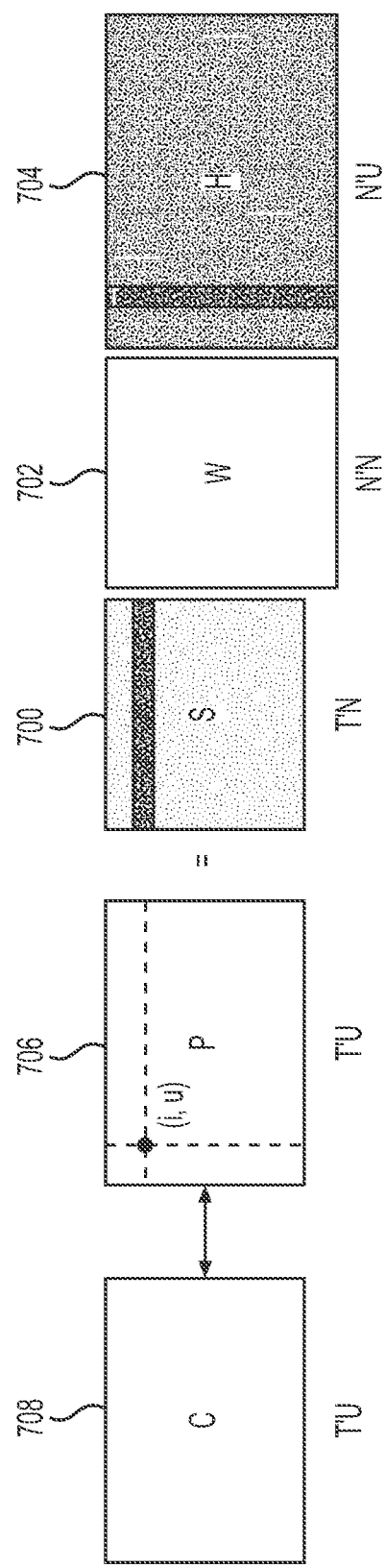
FIG. 7 illustrates a matrix operation, according to one implementation of the present disclosure.

At method operation 612, a predictive model is generated using the matrices in method operations 602, 606 and 610. In particular, the probability of a user u clicking on a new item i is modeled as a logistic function as follows:

$$P_{i,u} = \sigma(x_{i,u}) = \frac{1}{1+e^{-x_{i,u}}}$$

where $x_{i,u}$ is defined as one element in a production of a similarity matrix (S), a Weight matrix (W), and a History interaction matrix (H).

$$x_{i,u} = s_i \cdot W \cdot h_u^T$$

where $s_i$ is a row vector in the similarity matrix (S), $h_u^T$ is a column vector in the history matrix, and W is the item importance matrix to be learned. Thus, a prediction matrix (P), $P_{T \times U}$ is defined where each element, $P_{i,u}$, is the estimated score from the model. The model aims to minimize the errors between the current interaction matrix (C), which represents the actual interactions observed, and the prediction matrix (P), which indicates estimated probabilities for users' actions on the new items. In FIG. 7, this matrix operation involving similarity matrix (S) 700, a weight matrix (W) 702, a history interaction matrix (H) 704, and prediction matrix (P) 706 is graphically illustrated. As discussed above, the goal is to have the prediction matrix (P) 706 as accurate as possible in view of the current interaction matrix (C) 708.

At method operation 614, the weight matrix (W) (i.e., item importance matrix) is learned based on the model and the observed data. More specifically, a negative log-likelihood is adopted as the objective function:

$$J(W) = \sum_{i,u} [-C_{i,u} \log P_{i,u} - (1-C_{i,u}) \log(1-P_{i,u})] + \frac{\lambda}{2} \|W\|_2^2$$

Since the objective function is a convex problem with respect to the model parameter W, gradient descent algorithm is applied to obtain the solution. The gradient of W for one data point is computed as:

$$g(W)=(P_{i,u}-C_{i,u})s_i^T h_u+\lambda\|W\|$$

One way to reduce the model complexity is to assume that W is a diagonal matrix. Each element on the diagonal represents how much one historical item affects or contributes to the current action collectively from all users. Then the gradient with respect to a diagonal W is simplified as:

$$g(W)=(P_{i,u}-C_{i,u})\text{Diag}(s_i^T h_u)+\lambda\|W\|$$

An exemplary algorithm for the training process is as follows:

---
Pseudocode for the proposed algorithm

1: Input: C, H, $\epsilon$ = 1e − 6, $\eta$ = 0.01, $\lambda$ = 0.001, Iter
2: Output: W
3: procedure WORKER: COMPUTE GRADIENT($C_u$, $H_u$)
4:    Compute Similarity Matrix S
5:    for i in $C_u$ do
6:      $g(W)_{i,u} = (P_{i,u} - C_{i,u})*(s_i^T h_u) + \lambda W$
7:      $P_{i,u} = \dfrac{1}{1+e^{-x}}$, $x = s_i W h_u^T$ 8:    Return $g(W)_u$
9: procedure COORDINATOR:
10:    Distribute users' data to workers
11:    while t < Iter do
12:      Call compute gradient at workers
13:      Collect gradients from workers
14:      $\eta = \dfrac{\eta}{\left(\sqrt{g^2}+\epsilon\right)}$   \*Adaptive learning step
15:      Update $W = W - \eta g(W)_{i,u}$
16:      t = t + 1
17:    Return W

---

Three special cases of the proposed predictive model are now described.

Similarity: When W is an identity matrix, the predictive model approximates the probability that a user clicks on an item by the inner product of the similarity vector and the history action vector:

$$P_{i,u}=s^i h_u^T$$

When similarity vector is using inner-product, it can be transformed into:

$$P_{i,u}=\sum_{j\in H_u}\langle d_i, d_{j,u}\rangle H_{j,u} = \left\langle d_i, \sum_j d_{j,u} H_{j,u}\right\rangle = \langle d_i, f_u\rangle$$

In this case, this approach generated a simple user profile $f_u$ defined by $\Sigma_j d_{j,u} H_{j,u}$ as one of the outcomes. In one embodiment, the prediction is made by the inner-product of the current item and a user profile $f_u$.

Rocchio (when W is user-specific and diagonal with fixed values): For one user, it is assumed that W matrix is diagonal and the values on the diagonal are specified as $$\frac{\beta}{N_u^\oplus} \text{ or } \frac{\gamma}{N_u^\ominus}$$

depending on the action of the history documents. $N_u^\oplus$ is the number of relevant items to user u, and $N_u^\ominus$ is the number of non-relevant items to user u.

$$p_{i,u}=\sum_j S_{i,j}*\left[\frac{\beta}{N_u^\oplus}\mathbb{1}(H_{j,u}==1)+\frac{\gamma}{N_u^\ominus}\mathbb{1}(H_{j,u}==-1)\right]$$

When the similarity is using inner-product, this special case becomes equivalent to the Rocchio algorithm. Rocchio algorithm is a relevance feedback procedure used in information retrieval, to learn item weights that can then be used to retrieve relevant content items for the user. In Rocchio, the importance of relevant and non-relevant documents allowed to refine a query is dictated by the weight of the $\beta$ and $\gamma$ variables. The prediction is made by:

$$p_{i,u}=\sum_j \langle d_i, d_j\rangle *\left[\frac{\beta}{N_u^\oplus}\mathbb{1}(H_{j,u}==1)+\frac{\gamma}{N_u^\ominus}\mathbb{1}(H_{j,u}==-1)\right]$$

$$=\left\langle d_i, \frac{\beta}{N_u^\oplus}\sum_{j^\oplus} d_j + \frac{\gamma}{N_u^\ominus}\sum_{j^\ominus} d_j\right\rangle$$

Rocchio-$\gamma$ (when W is user-specific and diagonal with freedom 1): For each user, if W is diagonal and with one variable to be learned, the probability of a user clicking on an item is estimated by a sigmoid function:

$$P_{i,u}=\sigma(x)$$

where $$x=\sum_j S_{i,j}*(\mathbb{1}(H_{j,u}==1)+\gamma\mathbb{1}(H_{j,u}==-1))$$

In the Rocchio algorithm, if the action on a historical item is a click, the hyper-parameter for this item is $\beta$, otherwise it is $\gamma$. In this Rocchio-$\gamma$ model, the parameter $\beta$ is fixed (e.g., 1.0) and the other parameter $\gamma$ is learned. The objective function is:

$$-\sum_{u,i}[C_{u,i}\log p_{u,i}+(1-C_{u,i})(1-\log p_{u,i})]$$

and gradient on $$\gamma : g(\gamma)=-(p_{u,i}-C_{u,i})\Sigma_{j\in H_u\ominus}S_{i,j}$$

In the proposed predictive model generated in accordance with the implementations of the present disclosure, the training process can be adapted every time a new item arrives, without the need of building user profiles. Hence time-decay factors are taken into account by designing the proposed model to be adaptable (i.e., trainable) to the users' varying interests over time. This model also employs both negative and positive, and explicit (e.g., ratings or binary preference indicators) as well as implicit (i.e., inferred from the user's interaction with the item, such as dwelling time) user feedbacks in the history. Furthermore, the proposed model is easy to scale to large datasets in distributed computation with a large amount of users. Using this model, predictions for users or items that were not seen in training are possible and precursors for personalized content recommendations can be discovered, as further explained below with respect to FIG. 8.

Figure 8:
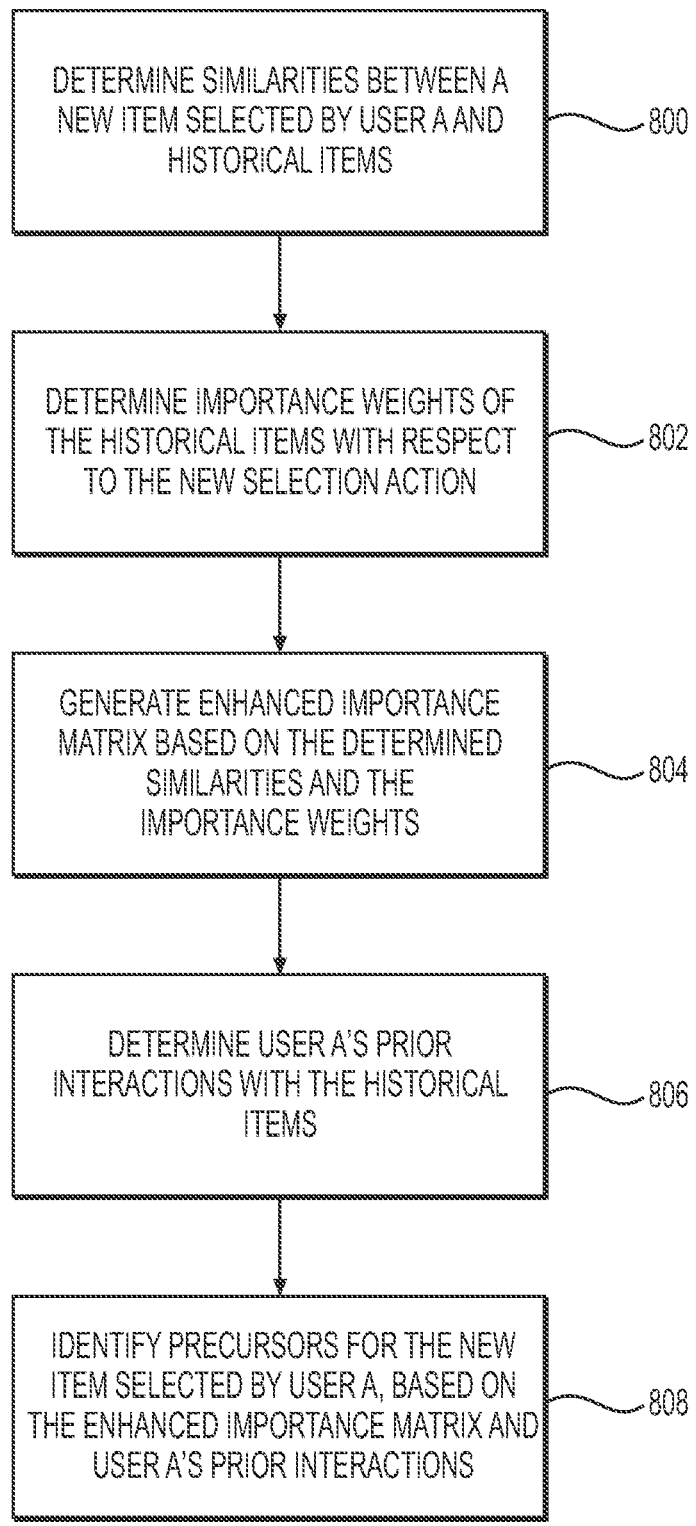
FIG. 8 illustrates a method of discovering precursors for a current user interaction event, according to one implementation of the present disclosure.

FIG. 8 illustrates a method of discovering precursors for a current user interaction event. The current user interaction event may, for instance, include a user selecting a new item. In the proposed algorithm, W is collectively learned by all users. The simple version is when W is diagonal where each value on the diagonal represents the importance of a historical item. In this case, when a user u selects a new item (e.g., news article) i, the precursors for this selected new item are not the historical items that are most semantically similar, but the ones influenced by collective users.

At method operation 800, similarities between a new item selected by user A and historical items are determined and formed into a similarity matrix $S_{1 \times N}^i$. As discussed above, the similarities can be measured by comparing the content features of the new items with the content features of the historical items. Each entry in the matrix contains a value or score that represents the similarity between the new item and a historical item:

$$\begin{pmatrix} 0.4 & 0.6 & 0.15 & 0.0 \end{pmatrix}$$
$$S_{1 \times N}^i$$

At method operation 802, importance weights of the historical items with respect to the new item currently selected by user A are determined and formed into a weight matrix (i.e., an item importance matrix) $W_{N \times N}$. This matrix can be learned based on the proposed predictive model discussed above with respect to FIG. 6. In this matrix, each value or score represents how much one historical item affects or contributes to the current user interaction event (e.g., user A's current action of selecting the new item) collectively from all users:

$$\begin{pmatrix} 1.0 & 0.2 & 0.4 & 0.1 \\ 0.5 & 1.0 & 0.2 & 0.1 \\ 0.6 & 0 & 1.0 & 0 \\ 0 & 0.2 & 0 & 1.0 \end{pmatrix}$$
$$W_{N \times N}$$

At method operation 804, a dot product of the Similarity matrix $S_{1 \times N}^i$ and the Weight matrix (i.e., an item importance matrix) $W_{N \times N}$ is taken to generate an enhanced importance matrix, Importance$^i$, as shown below. Each of the values in the generated Importance$^i$ is an enhanced value or score that represents the importance of each historical item to the new item collectively from all users:

$$\begin{pmatrix} 0.4 & 0.6 & 0.15 & 0.0 \end{pmatrix} \cdot \begin{pmatrix} 1.0 & 0.2 & 0.4 & 0.1 \\ 0.5 & 1.0 & 0.2 & 0.1 \\ 0.6 & 0 & 1.0 & 0 \\ 0 & 0.2 & 0 & 1.0 \end{pmatrix} = \underbrace{\begin{pmatrix} 0.79 & 0.68 & 0.43 & 0.1 \end{pmatrix}}_{\text{Importance}^i}$$

At method operation 806, user A's personal prior interactions with the historical items are determined, quantified, and formed into a matrix $H_{N \times 1}^u$ as shown below. The positive number may indicate that the user A's prior interaction was positive (e.g., click or dwell for a period longer than a predefined threshold), whereas the negative number may indicate the user A's prior interaction was negative (e.g., skip or dwell for a period shorter than a predefined threshold):

$$\begin{pmatrix} 1 \\ 1 \\ 1 \\ -1 \end{pmatrix}$$
$$H_{N \times 1}^u$$

At method operation 808, precursors for user A and the selected new item are identified. First, production of the Importance$^i$ (importance of the historical item to the new item collectively from all users) and $H_{N \times 1}^u$ (user A's personal prior interactions with the historical items) is taken as shown below. Then a threshold function is applied to distinguish precursors from non-precursors. For example, if the value of the product is greater than 0.5, the corresponding historical item is identified as a precursor and the value of the product is included in the Precursors matrix. If the value of the product is less than or equal to 0.5, the corresponding historical item is identified as a non-precursor and the value of the product is represented as O (i.e., zero) in the Precursors matrix:

$$\underbrace{\begin{pmatrix} .79 \\ .68 \\ .43 \\ .1 \end{pmatrix}}_{\text{Importance}^i} \times \underbrace{\begin{pmatrix} 1 \\ 1 \\ 1 \\ -1 \end{pmatrix}}_{H_{N \times 1}^u} = \underbrace{\begin{pmatrix} X \\ X \\ O \\ O \end{pmatrix}}_{\text{Precursors}}$$

The identified precursors may then be ranked in accordance with the respective values in the Precursors matrix and provided to the user who selected the new item, to help better understand why he/she selected the new item (i.e., what prior selections have led the user to view the new item). In another implementation, the precursors may be provided to engineers and programmers who designed the content recommendation/precursor discovery system to better understand why certain user actions (e.g., click or skip) happened and how they can further improve the system. In another implementation, the precursors may be provided to decision makers, content providers, and/or third party vendors to use the information to evaluate and set business objectives (e.g., target certain content items to certain users).

Implementations of the present disclosure concerning the predictive modeling addresses the drawbacks of the prior approaches for content recommendation, using some of the techniques discussed above with respect to user profile modelling, in addition to the matrix completion technique. In general, the predictive modelling approach in accordance with the implementations of the present disclosure has at least the following distinguishable features that lead to significant improvements in the content recommendation technology:

1) A novel approach based on matrix completion, which supports both user-independent model learning and collaborative learning without latent vectors. It enables predictions for new items that were not seen in training.

2) A method leveraging rich signals from both positive and negative user feedback to learn discriminative item importance.

3) A predictive model considering time-decay factors so that users' interests varying over time are tracked. Training data are collected from two continuous time windows, the current and the old. By regularly updating the training window, the model can be learned accordingly.

4) Mining of precursor events (or evidence) for content recommendation. This feature will help: users understand why they see a particular content item, developers understand why certain user actions (e.g., click and skip) happened and further improve the system, and decision makers to target content for users.

Figure 9:
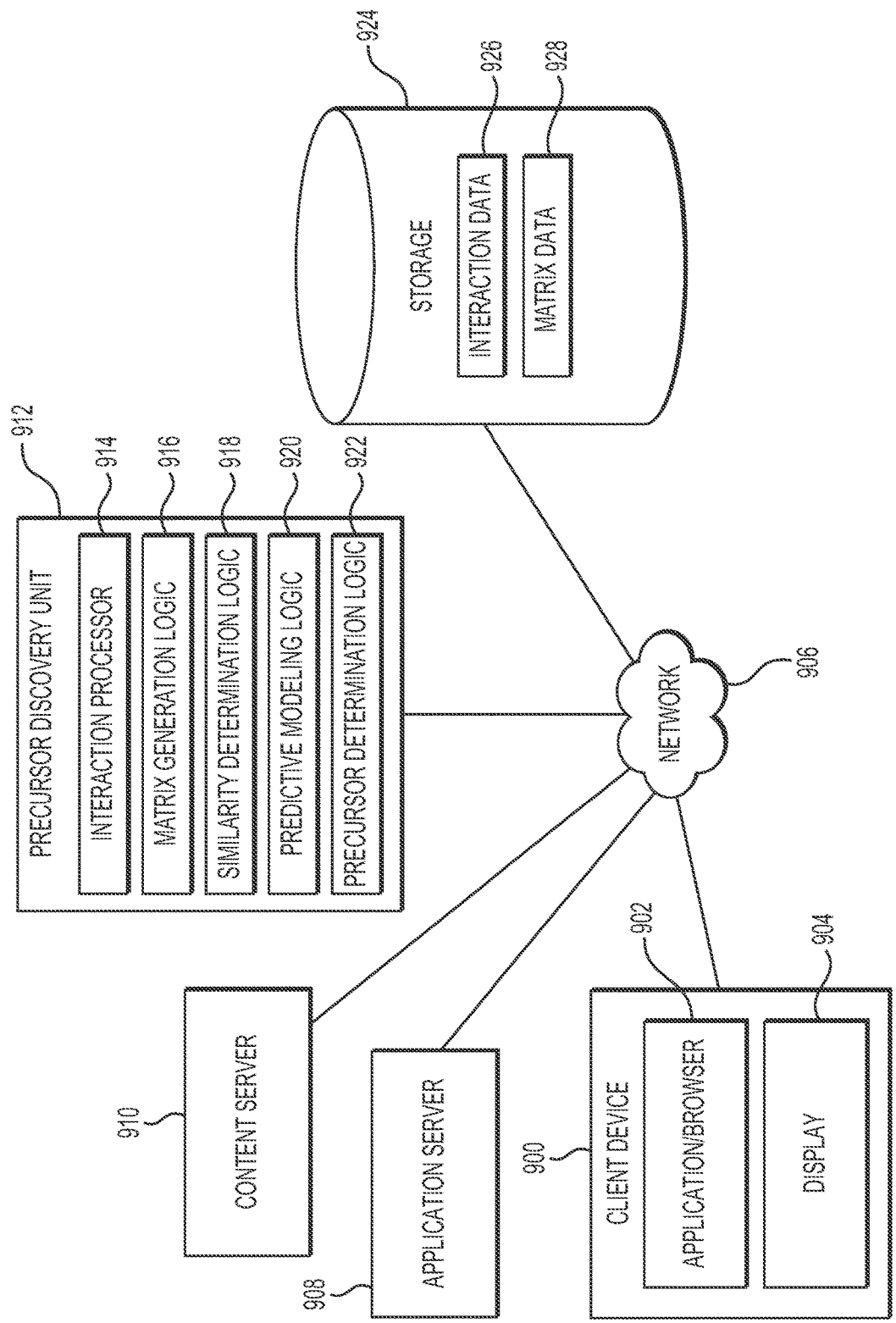
FIG. 9 illustrates a system for discovering precursors for users using a predictive model, according to one implementation of the present disclosure.

FIG. 9 illustrates a system for discovering precursors for users using the proposed predictive model according to one implementation of the present disclosure. Broadly speaking, the system can be configured to perform any of the methods for generating and using the predictive model to discover precursors and provide the discovered precursors over a network described according to one implementation of the present disclosure. A client device 900 is operated by a user to access a content site or platform, which in various implementations may be a social content/networking/sharing site, an e-commerce site, a news site, forum site, blogging site, etc. The client device 900 executes an application 902 (which in some implementations, may be a browser application or a web application) that is configured to render to the display 904 of the client device 900 an interface for interacting with the content site. For instance, the display 904 may display the content recommendations and precursors discovered in accordance with implementations of the present disclosure. The application 902 may communicate over a network 906 (e.g. the Internet) with an application server 908 to obtain data so that the user may access the content site, including accessing specific content, topics/categories, a personalized feed, etc.

It will be appreciated that in some implementations, content can be obtained from a separate content server 910 for rendering in the context of the interface that is rendered on the client device 900. For example, a preview of a piece of content (e.g. an article from a 3rd party news source) may be provided, and accessing the article may redirect to obtain the full content from the content server 910 (e.g. the 3rd party news source's content server).

A precursor discovery unit 912 is configured to determine precursors for a user clicking a content item in accordance with the methods disclosed herein. The precursor discovery unit 912 includes interaction processor 914 that is configured to process user interactions with content items, which may be stored as interaction data 926 in storage 924, to determine positive and negative interactions in accordance with the methods described above.

The precursor discovery unit 912 further includes matrix generation unit 916 that is configured to generate matrices containing quantified values that represent the processed user interactions with respect to the current and historical items (e.g., current interaction matrix (C), history interaction matrix (H)). This may entail coordinating with the interaction processor 914 to receive the user interaction data and/or retrieving the interaction data 926 from the storage 924. The matrix generation unit 916 is also configured to generate matrices containing values representative of the similarities (e.g., similarity scores) between the current and historical items, such as similarity matrix (S). The matrix generation unit 916 may receive the similarity values from similarity determination logic 918, which is configured to determine similarities between the content items, for instance by comparing their content features and generating similarity scores. The matrix generation unit 916 may also be configured to generate prediction matrix (P) and weight matrix (W) based on the observed data and the proposed predictive model, according to the implementations of the present disclosure. The matrices generated by the matrix generation 916 may be stored as matrix data 928 at storage 924.

The precursor discovery unit 912 further includes predictive modelling logic 920 configured to build and train the proposed predictive model based on the observed data. The predictive modelling logic 920 may operate in conjunction with other components in the precursor discovery unit 912, such as the interaction processor 914, matrix generation logic 916, similarity determination logic 918, and precursor determination logic 922, to obtain data necessary to build and train the predictive model.

The precursor discovery unit 912 also includes precursor determination logic 922 configured to use the predictive model to discover precursors for a new user interaction event (e.g., a particular user selecting a new item). The precursor determination logic 922 may also operate in conjunction with other components in the precursor discovery unit 912, such as the interaction processor 914, matrix generation logic 916, similarity determination logic 918, and predictive modelling logic 920. The results containing the identified precursors may be transmitted over the network 906 to the content server 910, application server 908, and/or client device 900, and provided to the user via an interface in the display 904.

FIG. 10 illustrates an implementation of a general computer system designated 1000. The computer system 1000 can include a set of instructions that can be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system 1000 may operate in the capacity of a server or as a client user computer in a server-client user network environment, or as a peer computer system in a peer-to-peer (or distributed) network environment. The computer system 1000 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 1000 can be implemented using electronic devices that provide voice, video or data communication. Further, while a single computer system 1000 is illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, e.g., a central processing unit (CPU), a graphics processing unit (GPU), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 1004 includes a cache or random access memory for the processor 1002. In alternative implementations, the memory 1004 is separate from the processor 1002, such as a cache memory of a processor, the system memory, or other memory. The memory 1004 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1004 is operable to store instructions executable by the processor 1002. The functions, acts or tasks illustrated in the figures or described herein may be performed by the programmed processor 1002 executing the instructions stored in the memory 1004. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 1000 may further include a display unit 1010, such as a liquid crystal display (LCD), an organic light emitting diode (OLED), a flat panel display, a solid state display, a cathode ray tube (CRT), a projector, a printer or other now known or later developed display device for outputting determined information. The display 1010 may act as an interface for the user to see the functioning of the processor 1002, or specifically as an interface with the software stored in the memory 1004 or in the drive unit 1006.

Additionally or alternatively, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the computer system 1000.

The computer system 1000 may also or alternatively include a disk or optical drive unit 1006. The disk drive unit 1006 may include a computer-readable medium 1022 in which one or more sets of instructions 1024, e.g. software, can be embedded. Further, the instructions 1024 may embody one or more of the methods or logic as described herein. The instructions 1024 may reside completely or partially within the memory 1004 and/or within the processor 1002 during execution by the computer system 1000. The memory 1004 and the processor 1002 also may include computer-readable media as discussed above.

In some systems, a computer-readable medium 1022 includes instructions 1024 or receives and executes instructions 1024 responsive to a propagated signal so that a device connected to a network 1026 can communicate voice, video, audio, images or any other data over the network 1026. Further, the instructions 1024 may be transmitted or received over the network 1026 via a communication port or interface 1020, and/or using a bus 1008. The communication port or interface 1020 may be a part of the processor 1002 or may be a separate component. The communication port 1020 may be created in software or may be a physical connection in hardware. The communication port 1020 may be configured to connect with a network 1026, external media, the display 1010, or any other components in system 1000, or combinations thereof. The connection with the network 1026 may be a physical connection, such as a wired Ethernet connection or may be established wirelessly as discussed below. Likewise, the additional connections with other components of the system 1000 may be physical connections or may be established wirelessly. The network 1026 may alternatively be directly connected to the bus 1008.

While the computer-readable medium 1022 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 1022 may be non-transitory, and may be tangible.

The computer-readable medium 1022 can include a solid-state memory such as a memory card or other package that houses one or more non-volatile read-only memories. The computer-readable medium 1022 can be a random access memory or other volatile re-writable memory. Additionally or alternatively, the computer-readable medium 1022 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 1000 may be connected to one or more networks 1026. The network 1026 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 1026 may include wide area networks (WAN), such as the Internet, local area networks (LAN), campus area networks, metropolitan area networks, a direct connection such as through a Universal Serial Bus (USB) port, or any other networks that may allow for data communication. The network 1026 may be configured to couple one computing device to another computing device to enable communication of data between the devices. The network 1026 may generally be enabled to employ any form of machine-readable media for communicating information from one device to another. The network 1026 may include communication methods by which information may travel between computing devices. The network 1026 may be divided into sub-networks. The sub-networks may allow access to all of the other components connected thereto or the sub-networks may restrict access between the components. The network 1026 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of discovering precursors associated with a current user interaction event, the method comprising:
  receiving a selection of a new item by a user;
  determining a plurality of similarities between the new item selected by the user and a plurality of historical items, the plurality of historical items being associated with prior user activity;
  determining a plurality of importance weights associated with the plurality of historical items, the determining the plurality of importance weights including generating and training a machine learning model using at least one similarity of the determined plurality of similarities, at least one historical item of the determined plurality of historical items, and at least one importance weight learned from user interaction events across a plurality of users;
  generating at least one enhanced importance matrix based on the plurality of similarities and the plurality of importance weights by determining a row matrix of a plurality of values representing the plurality of similarities and determining a matrix of the plurality of importance weights;
  determining prior interactions of the user with the plurality of historical items, wherein the prior interaction includes at least one or more positive interactions, including user selections and user dwell times that meet or exceed a predetermined threshold, and negative prior interactions;
  identifying one or more precursors for the new item selected by the user based on the enhanced importance matrix and the prior interactions of the user with the plurality of historical items, the identifying the one or more precursors for the new item selected by the user including applying a threshold function to distinguish precursors from non-precursors; and
  continuously updating the machine learning model with new importance weights based on user interaction events observed overtime.

2. The computer-implemented method of claim 1, further comprising providing, to a display, the identified precursors.

3. The computer-implemented method of claim 1, wherein each of the plurality of similarities is determined by comparing content features of the new item with content features of each of the plurality of historical items.

4. The computer-implemented method of claim 1, wherein identifying one or more precursors for the new item selected by the user comprises:
  determining a personal history matrix of a plurality of values representing the prior interactions of the user with the plurality of historical items; and
  determining a product of the enhanced importance matrix and the personal history matrix.

5. The computer-implemented method of claim 1, wherein each of the importance weights represents how each historical item affects the current user interaction event collectively from all users, the current user interaction event being the user clicking the new item.

6. The computer-implemented method of claim 1, wherein determining the plurality of importance weights comprises:
  generating a current interaction matrix having entries representing current actions of users on a plurality of new items;
  generating a history interaction matrix having entries representing prior actions of the users on a plurality of historical items;
  generating a similarity matrix having entries representing similarities between the plurality of new items and the plurality of historical items;

generating a prediction matrix having entries representing probabilities of users selecting the plurality of new items; and learning the importance weights of the plurality of historical items in a form of a weight matrix.

7. The computer-implemented method of claim 6, wherein learning the plurality of importance weights of the historical items comprises applying a gradient descent algorithm.

8. The computer-implemented method of claim 1, wherein the negative prior interactions include at least one or more of: user skips; and user dwell times that are less than a predetermined threshold.

9. A system for discovering precursors associated with a current user interaction event, the system comprising:
one or more processors; and
a non-transitory computer readable medium storing instructions that, when executed by the one or more processors, cause the one or more processors to perform a method comprising:
receiving a selection of a new item by a user;
determining a plurality of similarities between the new item selected by the user and a plurality of historical items, the plurality of historical items being associated with prior user activity;
determining a plurality of importance weights associated with the plurality of historical items, the determining the plurality of importance weights including generating and training a machine learning model using at least one similarity of the determined plurality of similarities, at least one historical item of the determined plurality of historical items, and at least one importance weight learned from user interaction events across a plurality of users;
generating at least one enhanced importance matrix based on the plurality of similarities and the plurality of importance weights by determining a row matrix of a plurality of values representing the plurality of similarities and determining a matrix of the plurality of importance weights;
determining prior interactions of the user with the plurality of historical items, wherein the prior interaction includes at least one or more positive interactions, including user selections and user dwell times that meet or exceed a predetermined threshold, and negative prior interactions;
identifying one or more precursors for the new item selected by the user based on the enhanced importance matrix and the prior interactions of the user with the plurality of historical items, the identifying the one or more precursors for the new item selected by the user including applying a threshold function to distinguish precursors from non-precursors; and
continuously updating the machine learning model with new importance weights based on user interaction events observed overtime.

10. The system of claim 9, wherein identifying one or more precursors for the new item selected by the user comprises:
determining a personal history matrix of a plurality of values representing the prior interactions of the user with the plurality of historical items; and
determining a product of the enhanced importance matrix and the personal history matrix.

11. A non-transitory computer readable medium storing instructions that, when executed by one or more processors, cause the one or more processors to perform a method of discovering precursors associated with a current user interaction event, the method comprising:
receiving a selection of a new item by a user;
determining a plurality of similarities between the new item selected by the user and a plurality of historical items, the plurality of historical items being associated with prior user activity;
determining a plurality of importance weights associated with the plurality of historical items, the determining the plurality of importance weights including generating and training a machine learning model using at least one similarity of the determined plurality of similarities, at least one historical item of the determined plurality of historical items, and at least one importance weight learned from user interaction events across a plurality of users;
generating at least one enhanced importance matrix based on the plurality of similarities and the plurality of importance weights by determining a row matrix of a plurality of values representing the plurality of similarities and determining a matrix of the plurality of importance weights;
determining prior interactions of the user with the plurality of historical items, wherein the prior interaction includes at least one or more positive interactions, including user selections and user dwell times that meet or exceed a predetermined threshold, and negative prior interactions;
identifying one or more precursors for the new item selected by the user based on the enhanced importance matrix and the prior interactions of the user with the plurality of historical items, the identifying the one or more precursors for the new item selected by the user including applying a threshold function to distinguish precursors from non-precursors; and
continuously updating the machine learning model with new importance weights based on user interaction events observed overtime.

12. The non-transitory computer readable medium of claim 11, wherein determining the plurality of importance weights comprises:
generating a current interaction matrix having entries representing current actions of users on a plurality of new items;
generating a history interaction matrix having entries representing prior actions of the users on a plurality of historical items;
generating a similarity matrix having entries representing similarities between the plurality of new items and the plurality of historical items;
generating a prediction matrix having entries representing probabilities of users selecting the plurality of new items; and
learning the importance weights of the plurality of historical items in a form of a weight matrix.

\* \* \* \* \*